Nov. 6, 1923.

S. L. MARSH 1,473,439

DRAINAGE FITTING

Filed May 15, 1922

INVENTOR.
Samuel L. Marsh
BY Westall and Wallau
ATTORNEYS.

Patented Nov. 6, 1923.

1,473,439

UNITED STATES PATENT OFFICE.

SAMUEL L. MARSH, OF LOS ANGELES, CALIFORNIA.

DRAINAGE FITTING.

Application filed May 15, 1922. Serial No. 560,872.

*To all whom it may concern:*

Be it known that I, SAMUEL L. MARSH, a citizen of the United States, and resident of Los Angeles, in the county of Los Angeles, State of California, have invented new and useful Improvements in a Drainage Fitting, of which the following is a specification.

This invention relates to a drainage fitting adapted for connection to closet bowls and pertains especially to a fitting adapted to serve as a unit in a battery.

In school houses, railroad depots, factories, ships and like institutions, it is the common practice to install water closets in batteries, the bowls being placed in a row and connected to a common waste line. Fittings are provided for connecting the bowls to the waste line, and means in combination with the fittings to support the bowls. Many of the fittings now used are constructed to carry the weight of the bowl. It is necessary to have a pitch in the waste line from one end of the battery to the other. This requires the positioning of the bodies of the fittings at different levels with respect to the floor. All of the bowls should be disposed at the same level. The result is that fittings differing in the positions of the fixture waste openings must be used. This necessitates either individual fittings of different dimensions, or means to adjust the fixture waste opening.

The primary object of this invention is to provide a fitting having a novel adjustable fixture waste coupling. Another object of this invention is to provide a fitting which will be relieved of the weight of the bowl. In addition to the broader objects of this invention, there are certain details of design, whereby an efficient fitting, easy to install, and durable in structure is obtained.

Figure 1:
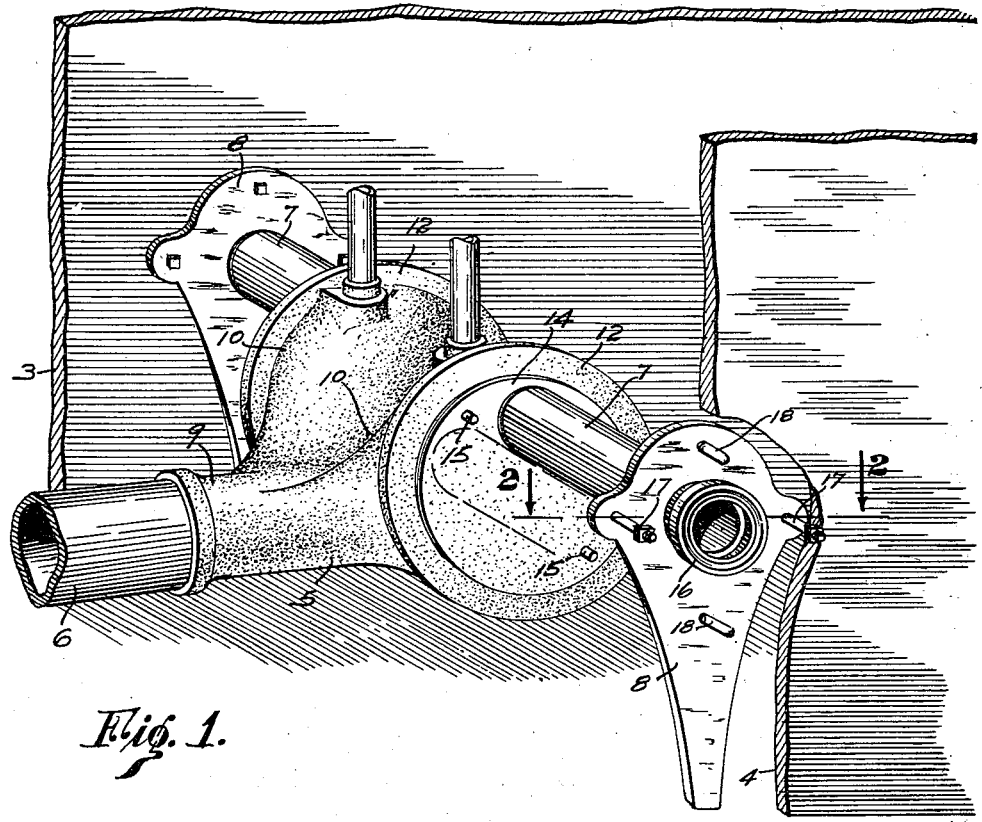
Figure 2:
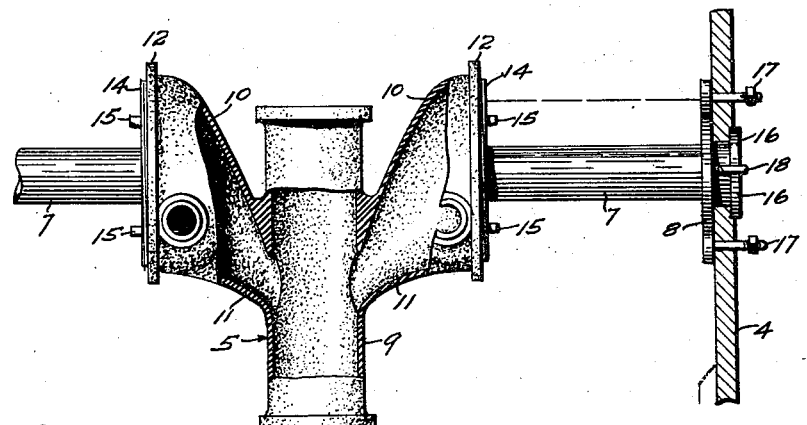

These objects together with other objects and corresponding accomplishments are obtained by means of the embodiment of my invention illustrated in the accompanying drawing, in which:

Fig. 1 is a perspective of a double Y fitting installed in a utility space ready for connection of the bowls thereto; and Fig. 2 is a plan view of the construction shown in Fig. 1, a portion of the fitting being shown in section to illustrate the relation of the passages.

Referring more particularly to the drawing, 3 and 4 indicate the walls of a utility space. Disposed between the walls 3 and 4 in the utility space is a drainage fitting indicated generally by 5. This fitting may be one of several in the utility space connected by sections of waste pipe 6 to one another. Extending from the fitting are fixture waste pipes 7 which are mounted in fixture carrier plates 8. The plates 8 are disposed against the inside of the walls 3 and 4 in the utility space and have bolts extending therethrough adapted to carry the closet bowls.

Referring more particularly to the fitting, I have shown herein a double Y fitting. It will be obvious that a single Y fitting may be used. The waste branch 9 has chambers 10 connected thereto forming the fixture branches and communicating with the waste branch 9 through openings disposed to one side of the face plate 12 of the fixture branches. The face plates 12, as shown herein, are substantially circular and are provided with relatively large openings. The openings may be threaded and mounted therein are coupling plugs 14 adapted to be rotated. Eccentric to each plug is a fixture waste opening to which the pipe 7 is connected. Projecting from the face of each plug 14 are diametrically disposed lugs 15 for convenience in turning the plug. It is obvious that a crow bar or other bar may be disposed between the lugs across the face of the plug and pressure exerted to turn the plug. By turning the plug the fixture waste opening may be disposed at different heights with respect to the body, and the fixture adapted for its position in the battery, there being a pitch of the waste line and all of the bowls being at the same height. Another position of the fixture waste pipe 7 is indicated in dotted lines in Fig. 1. The plugs 14 having been rotated to bring the fixture waste opening to proper position as to height, the fitting may be moved to the right or left to properly position the plates 8, in alignment with the opening.

Plate 8 has a foot adapted to rest on the floor and integral therewith a flange 16 forming a closet flange. The plate may be internally threaded at the neck of the closet flange to receive the end of fixture waste pipe 7. Secured to the plate 8 are bolts 17 serving to tighten the closet bowl against the plate. Bolts 18 are also provided for connection to the closet bowl.

It is obvious that a fitting may be installed in position and accommodated to the pitch of the waste line by rotating plug 14. The fixture waste opening is so positioned that the fixture waste will always be deflected to travel along the waste line as it enters the latter. Plate 8 carries the weight of the bowl thereby placing no weight upon the wall of the utility space. Various mechanical changes may be made without departing from the spirit of the invention.

What I claim is:

1. A drainage fitting comprising a fixture waste pipe mounting rotatably secured to the body of said fitting and including a fixture waste pipe eccentric thereto whereby said waste pipe may be moved to adjust its position.

2. A drainage fitting comprising a coupling having an opening for a fixture waste pipe, said coupling being rotatably secured in the body of said fixture and having an opening eccentric to the axis of rotation of said coupling, whereby said opening may be moved to adjust its position.

3. A drainage fitting comprising a coupling for a fixture waste pipe, said coupling comprising a rotatable circular plug having a fixture waste pipe opening eccentric thereto whereby said opening may be moved to adjust its position.

4. A Y drainage fitting having a waste branch and a fixture branch communicating therewith, a coupling secured to said fixture branch comprising a rotatable circular plug having a fixture waste pipe opening eccentric thereto so that said opening may be moved through an arc to adjust its position, said fixture branch communicating with said waste branch at a place offset to any position of said opening.

In witness that I claim the foregoing I have hereunto subscribed my name this 5th day of May, 1922.

SAMUEL L. MARSH.